(12) United States Patent
Brewer

(10) Patent No.: US 8,777,532 B2
(45) Date of Patent: Jul. 15, 2014

(54) BLIND FASTENER

(75) Inventor: Jonathan Brewer, Bedfordshire (GB)

(73) Assignee: Avdel UK Limited, Welwyn Garden, Hertfordshire (GB)

( * ) Notice: Subject to any disclaimer, the term of this patent is extended or adjusted under 35 U.S.C. 154(b) by 581 days.

(21) Appl. No.: 13/061,380

(22) PCT Filed: Jul. 1, 2009

(86) PCT No.: PCT/GB2009/050764
§ 371 (c)(1),
(2), (4) Date: May 10, 2011

(87) PCT Pub. No.: WO2010/023465
PCT Pub. Date: Mar. 4, 2010

(65) Prior Publication Data
US 2011/0206476 A1    Aug. 25, 2011

(30) Foreign Application Priority Data
Aug. 29, 2008  (GB) .................................. 0815717.4

(51) Int. Cl.
*F16B 13/04*        (2006.01)
(52) U.S. Cl.
USPC .............................................. 411/22; 411/34
(58) Field of Classification Search
USPC ................... 411/16, 22, 36, 14.5, 508, 70–72
See application file for complete search history.

(56) References Cited

U.S. PATENT DOCUMENTS

| | | | | |
|---|---|---|---|---|
| 2,918,841 | A | * | 12/1959 | Poupitch ........................ 411/36 |
| 3,007,364 | A | * | 11/1961 | Dickie ............................. 411/15 |
| 3,085,463 | A | | 4/1963 | Lay |
| 3,381,566 | A | * | 5/1968 | Passer ............................. 411/36 |
| 3,418,012 | A | * | 12/1968 | La Torre ..................... 403/408.1 |
| 3,735,665 | A | * | 5/1973 | Mortensen ...................... 411/36 |
| 3,942,407 | A | * | 3/1976 | Mortensen ...................... 411/36 |
| 4,309,136 | A | * | 1/1982 | Talan .............................. 411/36 |
| 4,776,738 | A | * | 10/1988 | Winston ....................... 411/82.1 |
| 4,781,500 | A | * | 11/1988 | Mauer ............................. 411/36 |
| 4,861,206 | A | * | 8/1989 | Riedel ............................ 411/36 |

(Continued)

FOREIGN PATENT DOCUMENTS

| | | |
|---|---|---|
| DE | 3612478 | 10/1987 |
| FR | 2655395 | 6/1991 |
| GB | 2151738 | 7/1985 |

OTHER PUBLICATIONS

Lacy, Raymond D., "The Avdel Monobolt Fastening System", Wire Industry, vol. 46, Nov. 12, Dec. 1, 1979, pp. 891-893.
Machine translation of FR 2655395, Jun. 7, 1991.

*Primary Examiner* — Gary Estremsky
(74) *Attorney, Agent, or Firm* — Hahn, Loeser & Parks LLP; Arland T. Stein

(57) ABSTRACT

A fastener (2) such as a rivet, and a method of manufacture of such, wherein the fastener (2) is formed with helical (16) and annular grooves on the shell (4), such that when the fastener (2) is installed into a workpiece (24), a bulb (30) having a lobed blindside footprint (36) is produced on the blindside of the workpiece (24), the helical grooves (16) having an increasing depth towards the head end (12) of the shell (4) to promote formation of the bulb (30) initially towards the head end (12).

7 Claims, 4 Drawing Sheets

(56) References Cited

U.S. PATENT DOCUMENTS

| | | | | |
|---|---|---|---|---|
| 5,246,323 A | * | 9/1993 | Vernet et al. | 411/29 |
| 5,501,695 A | * | 3/1996 | Anspach et al. | 606/232 |
| 5,741,282 A | * | 4/1998 | Anspach et al. | 606/151 |
| 5,820,321 A | * | 10/1998 | Gruber | 411/36 |
| 6,164,884 A | * | 12/2000 | Mayr | 411/36 |
| 6,660,008 B1 | * | 12/2003 | Foerster et al. | 606/327 |
| 6,926,483 B2 | * | 8/2005 | Hesse et al. | 411/36 |
| 7,503,106 B2 | * | 3/2009 | Crutchley et al. | 29/525.11 |

\* cited by examiner

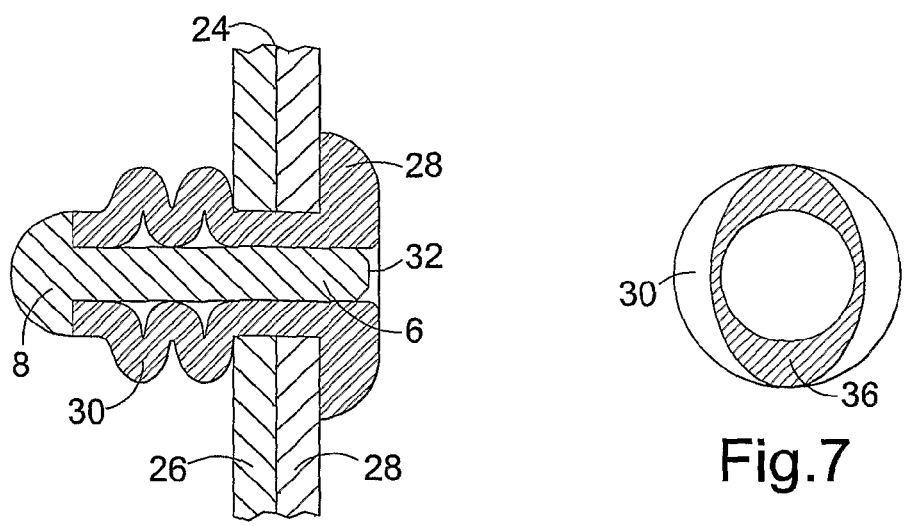
Fig.6
Fig.7
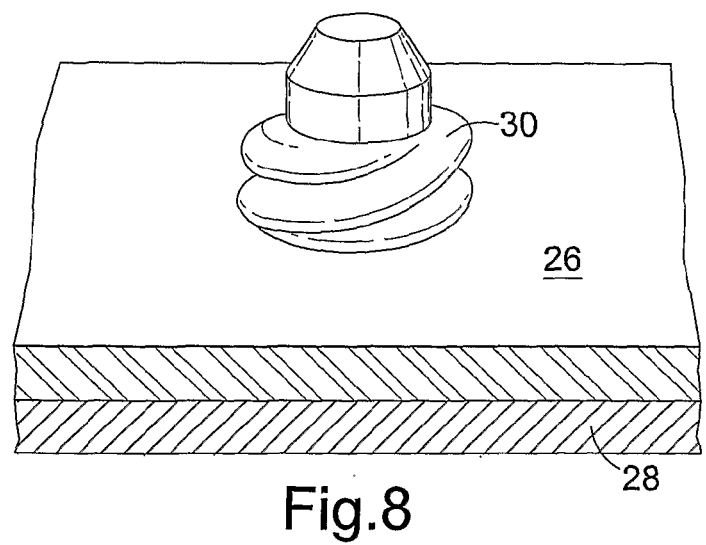
Fig.8
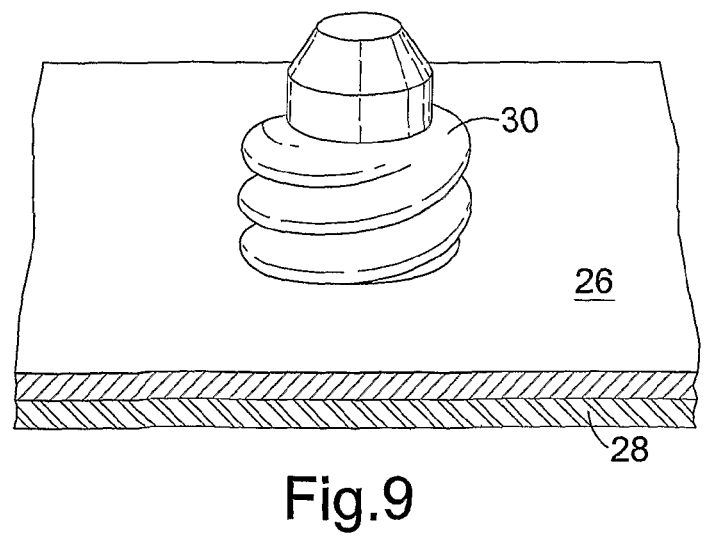
Fig.9

BLIND FASTENER

This invention relates to blind fasteners, and in particular to blind fasteners wherein bulbing of the fastener is caused during installation of the fastener in a workpiece comprising one or more workpiece members.

Blind fasteners (i.e. fasteners which can be installed by access to one side only of the workpiece) are well known.

Commonly a blind fastener comprises a tubular shell having an elongated shank, a preformed radially enlarged shell head at a one end (the head end) of the shell, a stem having a radially enlarged stem head at one end of the stem, wherein the stem extends through the core of the shell such that the stem head is at a tail end of the shell remote from the head end, and an end portion of the stem protrudes from the head end of the shell. The shell is inserted through aligned apertures in the workpiece comprising one or more workpiece members to be secured together so that the shell head abuts the near face of the workpiece and the tail end portion of the shell shank protrudes beyond the remote face (the blind face) of the workpiece. A placing tool is then used to apply an increasing pulling force to the protruding portion of the stem relative to the shell, the reaction force being supported by the shell head, so that the stem head deforms the tail end portion of the shell shank radially outwards and axially towards the shell head, to form a blind bulb which abuts the blind face of the workpiece. The workpiece is thus clamped between the shell head and the blind bulb. Usually the stem is then broken off flush with, or slightly inside, the head of the shell, at a breakneck preformed at the appropriate position along the stem. The breakneck breaking load is at a tension load which is greater than the load needed to completely form the blind bulb.

Blind fasteners which provide a high level of static and dynamic joint strength need to develop a high retained compressive force on the workpiece, between the shell head and blind bulb. Accordingly it is desirable to have a relatively large preformed shell head, and also to have a relatively large contact area between the blind bulb and the blindside of the workpiece. The area of contact between the blind bulb and the blindside of the workpiece is known as the blindside footprint. Examples of such a blind fasteners are those available under the trademarks BOM and HEMLOK, the latter being described in GB 2 151 738 A.

It is also desirable for a blind fastener to have a wide grip range, i.e. be capable of securing together one or more workpiece members having varying 'grips', i.e. varying total thicknesses of workpiece.

The grip range of HEMLOK or BOM fasteners is limited to, for example, no more than 2 mm for a 6.5 mm diameter fastener. The grip range of multiple bulbing rivets such as those available under the trademarks STAVEX or Masterfix K-Lock, wherein two or more bulbs are caused to form on the blindside of the workpiece, are larger than those of HEMLOK and BOM. However, at certain thicknesses within the grip range of a multiple bulbing fastener, the cross-sectional area of the bulb in contact with the rear face of the fastened workpiece will be very low, and there may even be a "standoff", whereby minimal footprint is generated, which results in a substantial reduction in fastening strength provided by the installed fastener.

A further preferable trait for blind fasteners is a similar axial stem travel at either end of the grip range. This can be achieved by positioning the breakneck such that the stem break occurs at a position within the head of the shell. As a result the remaining stem portion can contribute additionally to the shear strength of the installed rivet shell in all grip thicknesses.

This trait is furthermore displayed in "flush break" fasteners, such as those currently known under the trademarks MONOBOLT and MAGNABULB, wherein the breakneck is positioned such that once the stem has broken, the part of the stem remaining in the installed fastener positively locks into the head of the shell, providing high retention and optimal shear performance throughout the grip range.

It is an aim of the present invention to provide an improved blind fastener, and to provide a fastener which can consistently provide a wide grip range and a large footprint.

Accordingly, the present invention provides, in one aspect, a blind fastener for installation in a workpiece, the fastener comprising a shell; the shell including a core, a head at a head end of the shell, a tail end remote from the head end, and a radially expandable portion between the head end and the tail end; whereby, when the shell is inserted into a suitable aperture in the workpiece and a force is applied to the shell to urge the tail end of the shell towards the workpiece, the reaction force is supported by the head end of the shell, and the radially expandable portion of the shell is thereby caused to deform radially outwards and axially towards the shell head, to form a blind bulb which abuts a blind face of the workpiece and forms a blindside footprint; wherein at least one helical groove is recessed in a cylindrically-shaped external wall of the radially expandable portion of the shell, such that the blindside footprint is formed of at least one lobe; wherein the depth of the at least one helical groove decreases from the head end to the tail end of the shell.

The bulb resulting from installation of the blind fastener of the present invention provides an optimum combination of footprint size and grip range.

The depth of the helical groove preferably decreases from the head end to the tail end of the shell. The cross-sectional area of the helical groove may also decrease from the head end to the tail end of the shell. These features both have the effect of promoting the formation of the blind bulb closest to the shell head first. This provides an advantage if the workpiece comprises two or more workpiece members, as the rearmost workpiece member (i.e. the member furthest from the head end of the shell) is pulled towards the shell head, thereby closing any gaps between workpiece members so as to provide a more secure fastening.

The fastener may also be provided with one or more annular grooves in the external wall of the shell.

In an alternative embodiment, two helical grooves may be provided in the external wall of the shell thereby producing a double-lobed blindside footprint on installation of the fastener. In a further alternative embodiment, multiple helical grooves may be provided in the external wall of the fastener to produce a multi-lobed footprint on installation.

The fastener of the present invention may be of the pull-type, i.e. wherein the fastener comprises a stem which has a radially enlarged head, wherein part of the stem is within the core of the shell and a protruding portion of the stem protrudes beyond the shell head, and installation of the fastener is effected by application of a pulling force is applied to a stem relative to the shell. In this embodiment, the force to urge the tail end of the shell toward the workpiece is provided by the pulling force applied to the stem.

Alternatively, the fastener could be of the internally threaded shell type. i.e. the fastener does not include a stem; the force to urge the tail end of the shell towards the workpiece is provided by application of a pulling force to an externally threaded part which has been threaded into the internal threading of the shell.

The present invention provides in a further aspect a method of manufacturing a fastener, the fastener comprising a shell;

the shell including a core, a head end, a tail end remote from the head end, and a radially expandable portion between the head end and the tail end; the method comprising a step of; forming at least one helical groove into an external wall of the shell; wherein the depth of the at least one helical groove decreases from the head end to the tail end of the shell.

The helical grooves are preferably rolled onto a shell.

The helical grooves are preferably formed such the depth of the helical grooves decreases from the head end to the tail end of the shell, and further preferably such that the cross-sectional area of the of the helical grooves decreases from the head end to the tail end of the shell. On installation of the fastener into a workpiece, these features promote formation of the blind bulb initially closest to the head end of the shell.

The method according to the present invention may comprise an additional step of forming at least one annular groove into the external wall of the shell. The annular grooves may also be formed by rolling.

The method may also comprise an additional step of crimping at least part of the shell onto the stem, subsequent to inserting the stem through the core of the shell. This provides a temporary joining of the two components prior to installation.

The crimping is achieved by deforming at least part of the shell radially inwardly onto the stem, thereby reducing the outer diameter of the shell at that part. The part of the shell which is crimped is preferably at or near the tail end of the shell, thereby promoting the formation of the blind bulb initially closest to the head end of the shell. This is desirable because the if the bulb originates toward the tail end of the shell, the bulb may fail to provide sufficient clamp force to secure thin workpieces, or if a workpiece comprises two or more workpiece members, could fail to close small gaps between the workpiece members due to a "stand-off", i.e. a short pillar of unexpanded shell shank between the bulb and the rearmost workpiece member of the fastening.

Preferably, the shell is crimped onto the stem to a greater degree towards the tail end. For example, the degree of crimping may taper away from the tail end. This further promotes the formation of the blind bulb initially closest to the head end of the shell, and additionally prevents formation of the bulb completely up to the tail end of the shell, hence reducing the risk of "stem head entry", wherein the stem head pulls right into the shell bore. The shell could be crimped onto the stem over the whole length of the shell. In a further alternatively embodiment, the shell is parallel crimped onto the stem over a band near to the tail end, i.e. crimped to an equal degree over the band.

The method of the present invention may include an additional step of annealing the shell. The rolling of any grooves onto the shell may be performed prior to annealing and assembly with the stem.

The method of manufacturing a blind fastener may be used to produce a pull-type fastener as described above. In this case, the method includes a further step of inserting a stem through the core of the shell such that a part of the stem is within the core of the shell, and such that the stem head is adjacent the tail end of the shell, and a protruding portion of the stem protrudes beyond the shell head.

Alternatively, the method of manufacturing a blind fastener according to the present invention may be used to produce a fastener having an internally threaded shell, also as described above. In this case, the method would include an additional step of producing an internal thread in the shell.

An embodiment of the present invention will now be described by way of example and with reference to the accompanying drawings in which:

FIG. 3b is a detailed view of the profile of a helical groove of the fastener of FIG. 3a;

FIG. 6 is a longitudinal cross-sectional view of the installed fastener of FIG. 5a;

FIG. 7 is an underside view of the blind bulb of the installed fastener of FIG. 5a;

FIG. 8 is an isometric view of the installed fastener of FIG. 5a from the blindside of the workpiece;

FIG. 9 is an isometric view of the installed fastener of FIG. 5b from the blindside of the workpiece;

Figure 1:
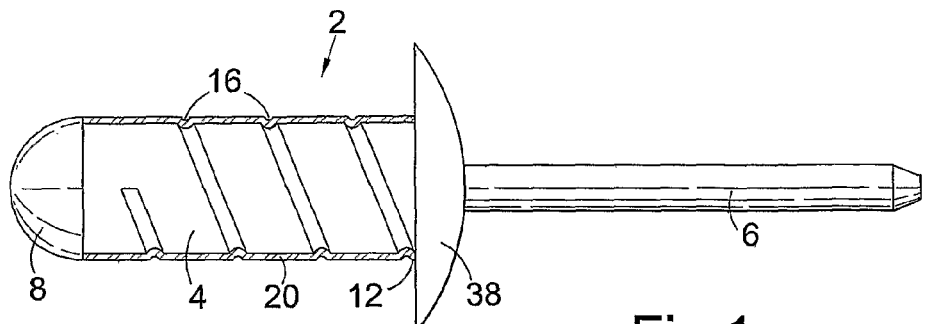
FIG. 1 is a side elevation of a fastener in accordance with the present invention.
Figure 2:
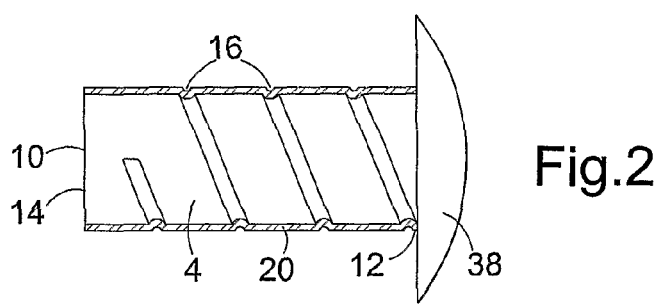
FIG. 2 is a side elevation of a shell of the fastener of FIG. 1.
Figure 3A:
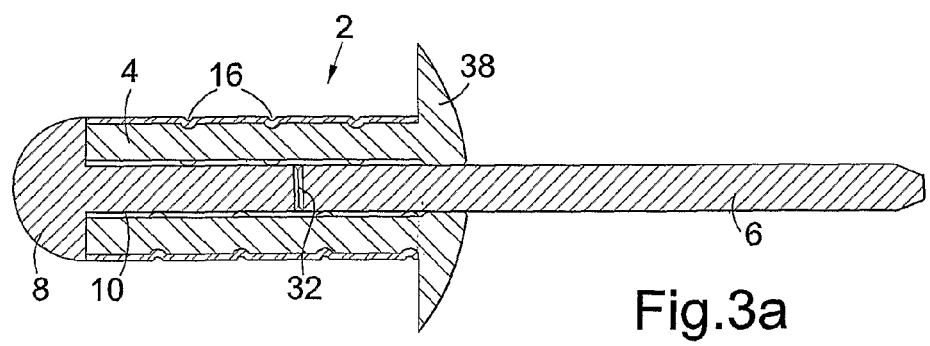
FIG. 3a is a longitudinal cross-sectional view of the fastener of FIG. 1.
Figure 3B:
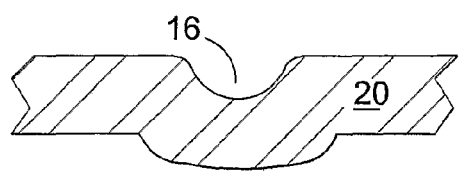

Referring to FIG. 1, the fastener 2 comprises a shell 4 and a stem 6. The stem 6 is provided with a stem head 8, and shell 4 is provided with a core 10 (see FIG. 3a), a radially enlarged head 38 at a head end 12, a tail end 14 remote from the head end 12.

Production of the fastener 2 includes formation of the helical grooves 16 into the external wall 20 of shell 4 by rolling. The helical grooves 16 are rolled in the form of a two- or three-start thread to avoid tilting of the shell 4 during installation in a workpiece. The shell 4 is annealed and subject to plating or surface finishing as needed. The stem 6 is then inserted into the core 10 of the shell 4 such that a part of the stem 6 is within the core 10 of the shell 4, the stem head 8 is adjacent the tail end 14 of the shell 4, and a protruding portion of the stem 6 protrudes beyond the shell head 14.

The depth of the helical grooves 16 decreases from the head end 10 of the shell 4 to the tail end 14.

Once the stem 6 has been inserted through the core 10 of the shell 4, shell 4 is crimped onto the stem 6. The crimping is achieved by applying pressure to the shell 4 to deform the material of the shell 4 onto the stem 6. The crimping is of a conical form, such that the shell is crimped to a greater degree towards the tail end 14 of the shell 4, with the degree of crimping tapering towards the head end 10.

Figure 4A:
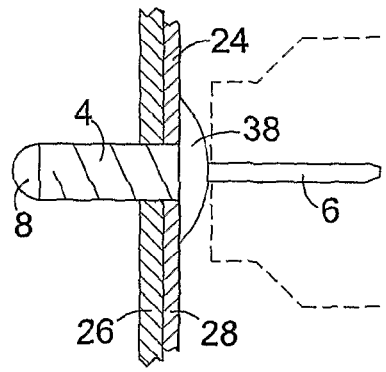
FIGS. 4a to 4c illustrate successive stages of installation of the fastener of FIG. 1 into a workpiece using a placing tool shown in phantom.

The method by which the fastener 2 is installed into a workpiece 24 comprising workpiece members 26, 28, thereby to secure the workpiece members together, is well known, and is described in the preamble of the present application. Successive stages of the installation are shown in FIGS. 4a to 4c.

The shell 4 is inserted into a suitable aperture in the workpiece members. A force is applied to the shell 4 to urge the tail end 14 of the shell 4 towards the workpiece 24, with the reaction force being supported by the head 14 of the shell 4, and the radially expandable portion of the shell 4 is thereby caused to deform radially outwards and axially towards the shell head 14, to form a helical blind bulb 30 which spirals along the length of the shell 4 and up to and against the workpiece member 26 closest to the stem head 8, and abuts a blind face of the workpiece 24 and forms a blindside footprint 36.

Figure 4B:
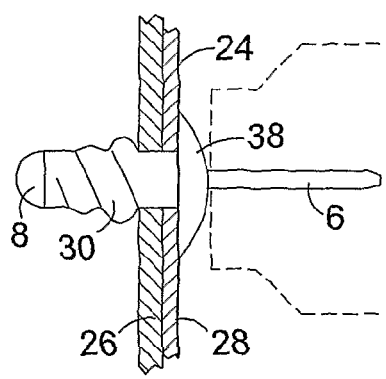

As shown in FIG. 4b, on installation of the fastener 2 into the workpiece 24, a blind bulb 30 is caused to form initially nearest the head end 12 of the shell 4, as a result of the increased depth of the helical grooves 16 nearest the head end 12 compared to that nearest the tail end 14, and because of the crimping of the shell 4 onto the stem 6.

Figure 4C:
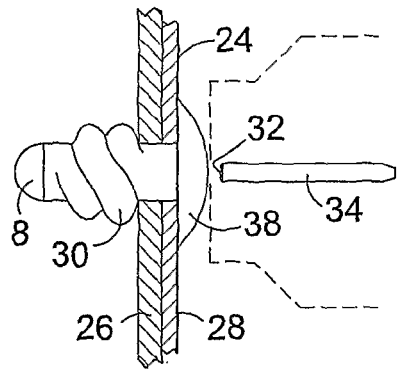

FIG. 4c shows the final stage of installation of the fastener into the workpiece. The stem has been caused to break at the stem break position, which is defined by the breakneck section 32 of reduced cross sectional area compared to the remainder of the stem. The separated portion 34 of the stem 6 is then removed.

Figure 5A:
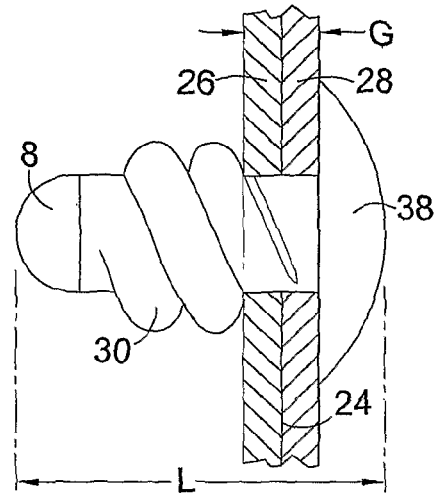
FIG. 5a is a side elevation of the fastener of FIG. 1 fully installed in a workpiece of a first grip value "G"
Figure 5B:
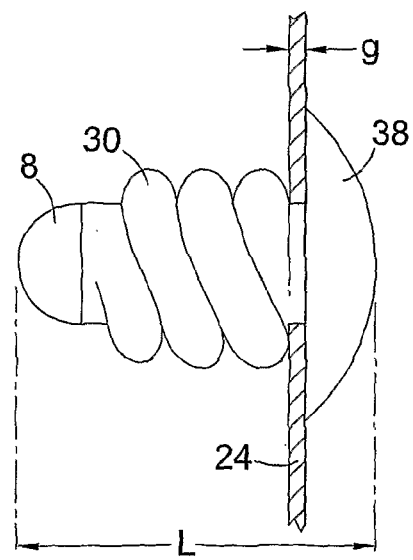
FIG. 5b is a side elevation of the fastener of FIG. 1 fully installed in a workpiece of a second grip value "g"

Once the fastener 2 has been fully installed into the workpiece 24, as shown in FIGS. 5a and 5b, a blindside footprint 36 has been formed by contact of the blind bulb 30 with the workpiece 24. The total length L of the installed fastener, is the same in both embodiments. It can be seen that the first grip value, G, of the workpiece in FIG. 5a, is thicker relative to the second grip value, g, of the workpiece in FIG. 5b.

FIG. 5b shows the fastener 2 installed into a thinner workpiece having a grip of g. A greater amount of the shell length has bulbed to form the spiral bulb on the blindside than in the workpiece of thicker grip of FIG. 5a. The overall installed fastener length "L" in both cases is substantially the same. (This allows the stem break position to be flush with the head of the body and a stem locking feature can be incorporated in this region).

FIG. 6 shows the stem break position is within the head region of the fastener body. Since the installed length of the fastener remains substantially the same in both thick and thin workpieces, the stem break is also contained within the head region. The stem cross section is therefore always contributing fully to the shear strength of the installed fastener.

As shown in FIG. 7, after installation of the fastener 2 into a workpiece 24, the resulting footprint on the blindside of the workpiece is formed of one lobe, i.e. is approximately oval shaped.

In the present embodiment, two helical grooves 16 are formed in the shell 4, resulting in a single-lobed blindside footprint shape. However, two helical grooves 16 could be formed in the shell 4, resulting in a double-lobed blindside footprint shape, i.e. a footprint shape consisting of two overlapping, substantially oval shapes. Alternatively, more multiple helical grooves 16 could be formed in the shell 4, to produce a multi-lobed blindside footprint, i.e. formed of multiple overlapping substantially oval shapes.

Although in the embodiment described herein the helical grooves 16 are formed in external wall 20 by rolling, other methods could be employed to form the grooves.

In an alternative embodiment, the profile of the helical grooves 16 is varied along the length of the shell 4, such that the cross-sectional area of the helical grooves 16 decreases form the head end 12 to the tail end 14 of the shell 4. This feature could be used alone or in combination with a decrease in depth of helical groove 16 from the head end 12 to the tail end 14, to promote formation of the blind bulb 30 towards the head end 12 initially on installation of the fastener 2 into a workpiece.

In the above embodiment, the workpiece comprises two workpiece members. The present invention is also applicable to workpieces comprising a single workpiece member, and to workpieces comprising more than two workpiece members.

Figure 10:
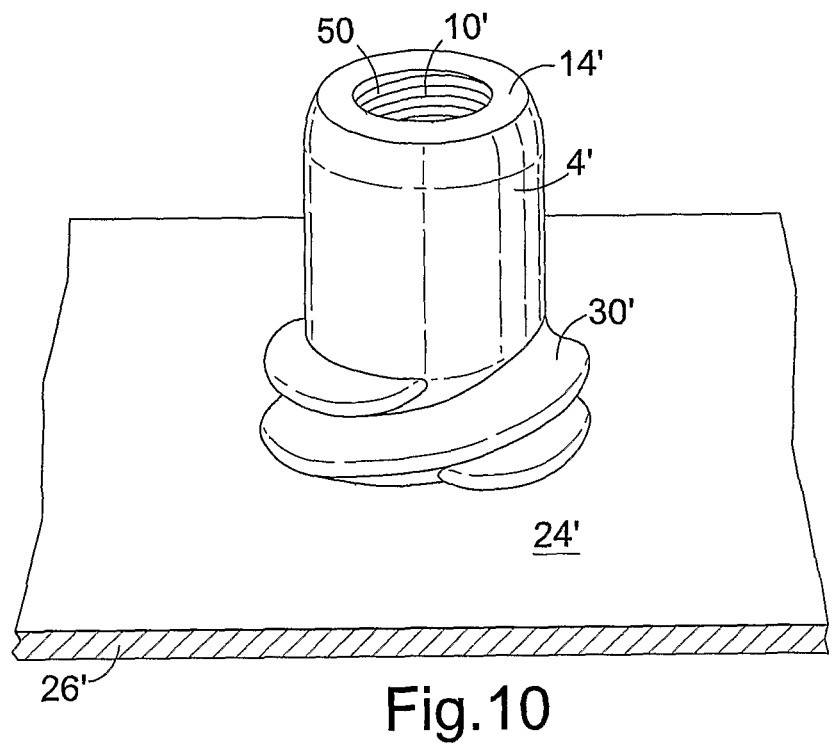
FIG. 10 is an alternative embodiment of a fastener according to the present invention installed in a workpiece.
Figure 11:
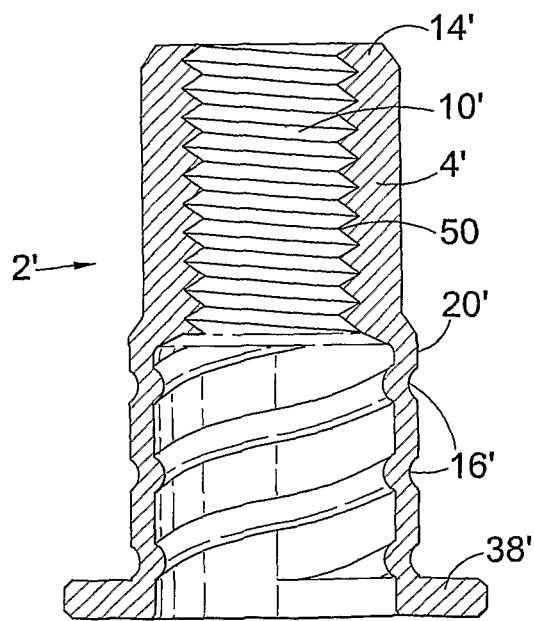
FIG. 11 is a longitudinal cross-sectional view of an alternative embodiment of the fastener of the present invention.

The present invention is also applicable to a fastener without a stem. Fastener 2', as illustrated in FIG. 10, comprises a shell 4'. In a similar manner to the first embodiment, the shell 4' is provided with a core 10', a head end 12', a tail end 14' remote from the head end 12', and a radially enlarged shell head 14' at the head end 12'. Production of the fastener 2' involves the same initial steps as the first embodiment 2'; helical grooves 16' are formed on the external wall 20' of the shell 4' by rolling. However, in this alternative embodiment, the core 10' is provided with internal threading 50.

To install the fastener 2' of FIG. 10 into a workpiece 24' comprising a workpiece member 26', the shell 4' is inserted into a suitable aperture in the workpiece, and an externally threaded part (not shown) of an installation tool is threaded into the internal threading 50 of the core 10' of the shell 4'. When the installation tool is actuated, the externally threaded part is subjected to a pulling force relative to the shell 4', and the and a reaction force is supported by the shell head 38'. The force on the shell causes the tail end of the shell to be urged towards the workpiece, and the radially expandable portion of the shell is thereby caused to deform radially outwards and axially towards the shell head, to form a blind bulb 30'. The blind bulb 30' thereby formed is multi-lobed, as in the first embodiment of the invention.

In the embodiment of FIG. 10, once the fastener 4' has been installed, the internal threading 50 allows a further workpiece member to be positioned on top of the workpiece member 26' and secured in position by a screw or bolt fastened into the internal thread 50.

In an alternative embodiment, the fastener may also include one or more annular grooves, formed in external wall 20 of the shell 4 by rolling.

In an alternative method of manufacturing the fastener, the crimping of the shell 4 onto the stem 6 could be performed over the entire length of the shell 4. In a further alternative method, the crimping is performed over a small band towards the tail end 14 of the shell 4. The degree of crimping in this alternative embodiment could be tapered as in the previous embodiments, or could be parallel, i.e. equal in degree across the crimped portion.

The invention claimed is:

1. A blind fastener for installation in a workpiece, the fastener comprising a shell;
    the shell including a core, a head at a head end of the shell, a tail end remote from the head end, and a radially expandable portion between the head end and the tail end;
    whereby, when the shell is inserted into a suitable aperture in the workpiece and a force is applied to the shell to urge the tail end of the shell towards the workpiece, the reaction force is supported by the head end of the shell, and the radially expandable portion of the shell is thereby caused to deform radially outwards and axially towards the shell head, to form a blind bulb which abuts a blind face of the workpiece and forms a blindside footprint;
    wherein at least one helical groove is recessed in a cylindrically-shaped external wall of the radially expandable portion of the shell, such that the blindside footprint is formed of at least one lobe;
    wherein the depth of the at least one helical groove decreases from the head end to the tail end of the shell.

2. A blind fastener as claimed in claim 1 wherein the cross-sectional area of the profile of the helical grooves decreases from the head end to the tail end of the shell.

3. A blind fastener as claimed in claim 1 further at least one annular groove is provided in the external wall of the shell.

4. A blind fastener as claimed in claim 1 wherein two helical grooves are provided in the external wall of the shell and the blindside footprint is double-lobed.

5. A blind fastener as claimed in claim 1 wherein multiple helical grooves are provided in the external wall of the shell and the blindside footprint is multi-lobed.

6. A blind fastener as claimed in claim 1 wherein the fastener further comprises a stem, the stem including a radially enlarged stem head,
- part of the stem being within the core of the shell, the stem head being adjacent the tail end of the shell, and a protruding portion of the stem protruding beyond the shell head;
- whereby, when a pulling force is applied to the stem relative to the shell, the stem head thereby applies the force to the shell to urge the tail end of the shell towards the workpiece.

7. A fastener as claimed in claim 1 wherein the core of the shell is internally threaded,
- whereby, when an externally threaded part is threaded into the core of the shell, and a pulling force is applied to the externally threaded relative to the shell, the externally threaded part thereby applies the force to the shell to urge the tail end of the shell towards the workpiece.

* * * * *